Patented Nov. 8, 1949

2,487,376

UNITED STATES PATENT OFFICE 2,487,376

LUBRICANT

Theodore G. Roehner, Mount Vernon, and George W. Murray, Pleasantville, N. Y., assignors to Socony-Vacuum Oil Company, Incorporated, a corporation of New York No Drawing. Application April 17, 1948, Serial No. 21,755

10 Claims. (Cl. 252—42)

This invention relates to lubricants and, more particularly, is concerned with lubricants characterized by a high order of effectiveness under severe operating conditions.

It is well known that lubricants generally lose some or all of their effectiveness when subjected to high temperature and pressure conditions, and this is particularly true of greases exposed to such conditions. In lubricating machine parts with a grease, it is essential to provide a grease which will substantially retain its character under the foregoing conditions. Failure to do so results in high consumption of the lubricant and frequent servicing. In general, available greases suffer from a marked tendency to change in character when used over a wide range of temperature. For example, the consistency of a conventional grease is prone to change over a wide range of temperature. Certain soda base greases, for example, have a pronounced and undesirable property of changing from a short to a long fibre structure with temperature change. Some conventional greases are also characterized by excessive softening when exposed to elevated temperatures, thereby being extruded too rapidly from the area being lubricated to provide efficient lubrication. In addition, some greases tend to lose their oil content when used at elevated temperatures and pressures. This condition is generally referred to in the art as "bleeding."

In accordance with the present invention, there has now been discovered a grease which is characterized by a high order of effectiveness under severe operating conditions and which is substantially free from the shortcomings discussed hereinabove. The greases contemplated herein contain, as a characterizing or reinforcing agent, a small amount of a water-dispersible or oil-insoluble and water-soluble polyvinyl alcohol.

Polyvinyl alcohols are generally commercially produced by the hydrolysis of polyvinyl acetate. The physical properties of the polyvinyl alcohols so obtained are governed by the degree of polymerization attained and the extent to which hydrolysis is allowed to proceed. Since the degree of polymerization varies directly with the viscosity of a given aqueous solution, a convenient means for ascertaining the degree of polymerization of a particular polyvinyl alcohol is the determination of the viscosity of an aqueous solution thereof. Generally, the polyvinyl alcohols contemplated for use in stabilizing the greases of this invention, when in the form of a 4 per cent aqueous solution at 20° C., are characterized by an average viscosity of between about 5 and about 100 centipoises. Another factor of importance in determining the properties of the polyvinyl alcohol produced is the degree of hydrolysis. The so-called "completely hydrolyzed" product contains usually 1-5 per cent of residual acetate groups. The percentage of acetate left in the macro-molecule may range upward from this minimum. When dealing with polymers of comparable molecular weights, the lower the percentage of acetate left in the polymer, the greater the solubility in water, the greater the resistance to oils, and the higher the softening point. The polyvinyl alcohols contemplated herein are those in which the degree of hydrolysis is within the range of from about 50 to about 100 per cent. A preferred polyvinyl alcohol for present purposes is one characterized by a viscosity of 20-25 centipoises at 20° C. in the form of a 4 per cent aqueous solution and in which the degree of hydrolysis is between about 90 and about 95 per cent.

The greases of this invention containing one or more of the aforesaid characterizing agents are the alkali metal and alkaline earth metal base greases; that is, those grease compositions consisting of mineral oil in admixture with alkali metal or alkaline earth metal soaps of fatty acids or with a sufficient proportion of such soaps present to give the characteristics usually recognized as attributable to alkali and alkaline earth metal base greases. The soap content of these greases is generally between about 10 and about 55 per cent by weight on the basis of the final product. They are generally prepared by heating a fat or a fatty acid, or a mixture thereof, with a mineral oil and thereafter heating the resultant mixture with the desired metal hydroxide at elevated temperatures to obtain a substantially anhydrous metal base grease. The final product so obtained generally contains 8.5 to 48 per cent fat or fatty acid; 1.5 to 7.5 per cent metal hydroxide (dry basis); and 29.5 to 89.5 per cent mineral oil. In obtaining the grease, the mixture may be cooked, for example, at temperatures of 250 to 400° F. Available steam-cooked greases do not maintain their shape at elevated temperatures and fire-cooked greases are typified by "bleeding" under such conditions.

The mineral oil constituent of the greases contemplated herein may vary considerably in character and includes residual or distilled oils. Preference is accorded, however, to oils having a viscosity (S. U. V.) of 100 to 250 seconds at 210° F. Similarly, the fats and fatty acids which may be used are those generally found in the soap type greases. Representative of such materials are vegetable, animal, and fish fatty oils, and hydrogenated fatty materials thereof. While sodium hydroxide and calcium hydroxide are preferred in view of cost considerations and a greater demand by industry for soda and lime base greases, other metal hydroxides may be used in the present greases, preferably where the soap constituent of the grease is prepared by direct saponification in aqueous phase. Accordingly, such other metal hydroxides as those of lithium, potassium, magnesium, barium, strontium, etc., are contemplated herein, with the alkali metal hydroxides preferred.

It has been found, in accordance with this invention, that from one to two parts by weight of alkali or alkaline earth metal soap may be replaced with one part of water-dispersible polyvinyl alcohol to yield a resulting lubricating grease composition characterized by resistance to deformation and "bleeding." The particular degree of substitution of soap by the water-dispersible polyvinyl alcohol will depend in part on the nature of the soap being replaced. Thus, in the case of a sodium base grease, approximately one part by weight of water-dispersible polyvinyl alcohol will replace one and one-half parts by weight of soap, while with a calcium base grease, approximately one part by weight of polyvinyl alcohol may be substituted for two parts by weight of soap. Likewise, the extent of substitution of soap by water-dispersible polyvinyl alcohol depends on the nature of the soap being replaced. It is generally contemplated, however, that the replacement of soap by polyvinyl alcohol will not exceed about 30 per cent of the soap content. Thus, in the case of a soda base grease, it has been found that up to 30 per cent of the soap could be replaced with water-dispersible polyvinyl alcohol. For example, 50 per cent soap in a soda base grease may be replaced with 35 per cent soap and 15 per cent of water-dispersible polyvinyl alcohol. In the case of a lime base grease, up to 20 per cent of the soap may be replaced with water-dispersible polyvinyl alcohol. For instance, 50 per cent soap content in a lime base grease may be replaced with 40 per cent of the same soap and 10 per cent of water-dispersible polyvinyl alcohol.

It will thus be apparent that the characterizing materials of this invention may be used in various amounts extending over a range of from about ½ per cent to about 15 per cent. Preferred amounts for the alkali metal greases, such as soda base grease, are of the order of ½ per cent to 6 per cent and for the alkaline earth metal greases, typified by lime base grease, are from about ½ per cent to about 4 per cent by weight of the finished grease.

It has further been discovered that the characterizing water-dispersible polyvinyl alcohols described above are most advantageously incorporated in the soap greases prior to or during the saponification stage, as illustrated by the following procedure. A fat or fatty acid, or mixture thereof, is added to mineral oil in order to provide a blend thereof; if necessary, the materials may be heated in order to thoroughly distribute the fatty material in the mineral oil. The characterizing material of water-soluble or water-dispersible polyvinyl alcohol is then dissolved or dispersed in water and the resulting water solution is dispersed or emulsified with the blend of fatty material and mineral oil. The resulting dispersion or emulsion is thereafter saponified with a metal hydroxide solution such as caustic soda. Following the latter treatment, water—of solution and of reaction—is evaporated by heating and stirring the saponified mixture at a temperature above about 220° F., preferably at 260° F. In this evaporation operation, the saponified mixture may also be steam-cooked at temperatures of the order of 250 to 330° F. or fire-cooked at temperatures in the range of 300 to 450° F. The grease is then withdrawn from the vessel in which it was prepared and run into a suitable mold. The grease is allowed to cool, whereupon it solidifies. The solid grease may then be cut into cakes of desired size. By following this preferred procedure, the characterizing water-dispersible polyvinyl alcohol is incorporated in the grease in an extremely fine dispersed state and the grease is provided with a high order of effectiveness.

The greases of this invention are illustrated by the following typical example:

*Example*

An amount of one part by weight of water-dispersible polyvinyl alcohol, a 4 per cent aqueous solution of which, at 20° C., has an average viscosity of approximately 70 centipoises and in which the degree of hydrolysis is within the range 76–79 per cent, was dispersed with stirring in 40 parts of cold water. Forty-four parts of mineral oil (S. U. V. of 150 seconds at 210° F.) and 30 parts of a fatty material were then added with stirring to the polyvinyl alcohol solution and heated. The fatty material was a mixture of hydrogenated fatty acids (24 parts) obtained by hydrogenation of fish oil fatty acids and hydrogenated fat (6 parts) obtained by hydrogenated fish oil fat. The polyvinyl alcohol-oil-fat solution was heated at about 160° F. and agitated vigorously, whereupon an emulsion was obtained. Caustic soda solution (45 per cent aqueous solution, 4½ parts) was added to the emulsion at 160° F., agitation being completed in 10 minutes. The mixture thus obtained was heated and agitated for 3 hours at 280° F. to complete the saponification and was substantially dehydrated (water content—0.1 per cent) thereafter by heating or fire-cooking to a temperature of 330° F. The grease was then allowed to cool, whereupon it solidified. The final product, hereinafter referred to as Grease I, is identified by the following characteristics, all figures being on a dry basis:

| Grease I | Per Cent |
| --- | --- |
| Hydrogenated Fatty Acids | 30.3 |
| Hydrogenated Fat | 7.3 |
| Sodium Hydroxide | 5.7 |
| Mineral Oil | 55.45 |
| Polyvinyl Alcohol | 1.25 |

The outstanding character of the aforesaid grease is shown by the established deformation and "bleeding" test, as set forth hereinafter, which was run on samples of the said grease and on a comparable and typical soda soap grease known in the art, such as one having the following characteristics:

| Grease II | Per Cent |
| --- | --- |
| Hydrogenated Fatty Acids | 30.65 |
| Hydrogenated Fat | 7.4 |
| Sodium Hydroxide | 5.8 |
| Mineral Oil | 56.15 |
| Polyvinyl Alcohol | None |

Grease II was prepared by direct saponification of fatty materials and mineral oil with a strong caustic solution in the proportions indicated above and thereafter was substantially dehydrated.

One-inch cubes were cut from 1" thick grease slabs which were representative cross sections of the grease blocks under test. The cubes were placed on an open tray and the tray was placed on a shelf in a constant temperature electric oven. The cubes were heated at 250° F. for one hour, at 300° F. for one hour, and finally at 350° F. without being removed from the oven. After each of the aforesaid heating periods, the top side of each cube was slightly pressed down with the flat side of a spatula to determine whether there was any deformation or "slumping" of the cube. In order to pass the test, the sample should show only a slight spreading at the base of the cube and no free oil at the base of the cube after the third test period of 350° F. The results (average of 4 tests) of these tests are tabulated below:

| Grease | | Dimensions of Test Cubes | | Per Cent Increase in Base Area | Per Cent Decrease in Height | Oil at Base |
| --- | --- | --- | --- | --- | --- | --- |
| | | Before Heating | After Heating | | | |
| I | Base | 1.00" x 1.00" | 1.125" x 1.188" | 34 | 13 | None. |
| | Height | 1.00" | 0.88" | | | |
| II | Base | 1.00" x 1.00" | 1.25" x 1.31" | 64 | 38 | Considerable. |
| | Height | 1.00" | 0.625" | | | |

It will be apparent from the foregoing results that Grease I, which contains polyvinyl alcohol, is greatly superior to Grease II in its resistance to "bleeding," as shown by the oil extruded from the latter grease and also in its substantially smaller degree of deformation. The improved greases of this invention are excellent lubricants for locomotive driving journals where high temperatures and pressures are encountered. They also find application as anti-friction bearing greases; for example, ball bearing and roller bearing greases. Other applications for these improved greases will be apparent to those skilled in the art.

The characterizing materials of this invention, as pointed out above, may be used in various amounts in imparting improved properties to greases. In general, the various constituents (on a dry basis) of greases contemplated herein may vary within the following limits:

| | Per cent |
| --- | --- |
| Fatty material | 8½–48 |
| Alkali | 1½– 7½ |
| Mineral oil | 29½–89½ |
| Polyvinyl alcohol | ½–15 |

It is to be understood that the greases of this invention may also contain other characterizing agents and fillers. For example, they may contain grease anti-oxidants, such as amines, phenols, sulfides, etc.; fillers, such as asbestos, graphite, mica, talc, etc.; and lubricity improving agents, such as free fat, free fatty acids, sulfurized fats, and lead soaps.

It is to be understood, moreover, that the foregoing specific examples are but representative of the greases contemplated herein. The present invention, therefore, is not to be construed as limited thereto but is to be broadly interpreted in the light of the claims appended hereto.

This application is a continuation-in-part of co-pending application Serial Number 602,667, filed June 30, 1945, now U. S. Patent 2,441,720.

We claim:

1. A lubricating grease composition prepared from about 8.5 to about 48 per cent of a fatty material, about 1.5 to about 7.5 per cent of an alkaline material selected from the group consisting of alkali metal hydroxides and alkaline earth metal hydroxides, about 0.5 to about 15 per cent of a water-dispersible polyvinyl alcohol, and the balance, mineral oil.

2. A lubricating grease composition prepared from about 8.5 to about 48 per cent of a fatty material, about 1.5 to about 7.5 per cent of an alkali metal hydroxide, about 0.5 to about 6 per cent of a water-dispersible polyvinyl alcohol, and the balance, mineral oil.

3. A lubricating grease composition prepared from mineral oil, about 8.5 to about 48 per cent of a fatty material, about 1.5 to about 7.5 per cent of an alkaline material selected from the group consisting of alkali metal hydroxides and alkaline earth metal hydroxides, and about 0.5 to about 15 per cent of a polyvinyl alcohol having an average viscosity, at 20° C., of between about 5 and about 100 centipoises when in the form of a 4 per cent aqueous solution and a degree of hydrolysis within the range of 50–100 per cent.

4. A lubricating grease composition prepared from mineral oil, about 8.5 to about 48 per cent of a fatty material, about 1.5 to about 7.5 per cent of sodium hydroxide, and about 0.5 to about 6 per cent of a polyvinyl alcohol having an average viscosity, at 20° C., of between about 5 and about 100 centipoises when in the form of a 4 per cent aqueous solution and a degree of hydrolysis within the range of 50–100 per cent.

5. A soda soap lubricating grease characterized by resistance to deformation and "bleeding," comprising sufficient mineral oil to form said grease, a sodium soap content of from about 10 to about 55 per cent and from about 0.5 to about 15 per cent of a water-dispersible polyvinyl alcohol.

6. A soda soap lubricating grease characterized by resistance to deformation and "bleeding," comprising sufficient mineral oil to form said grease, a sodium soap content of from about 10 to about 55 per cent and from about 0.5 to about 6 per cent of a polyvinyl alcohol having an average viscosity, at 20° C., of between about 5 and about 100 centipoises when in the form of a 4 per cent aqueous solution and a degree of hydrolysis within the range of 50–100 per cent.

7. A lubricant selected from the group consisting of alkali metal base greases and alkaline earth metal base greases characterized by resistance to deformation and "bleeding," comprising sufficient mineral oil to form a grease, a soap content of from about 10 to about 55 per cent and from about 0.5 to about 15 per cent of a water-dispersible polyvinyl alcohol.

8. A lubricant selected from the group consisting of alkali metal base greases and alkaline earth metal base greases characterized by resistance to deformation and "bleeding," comprising sufficient mineral oil to form a grease, a soap content of about 10 to about 55 per cent and from about 0.5 to about 15 per cent of a polyvinyl alcohol having an average viscosity, at 20° C., of between about 5 and about 100 centipoises when in the form of a 4 per cent aqueous solution and a degree of hydrolysis within the range of 50–100 per cent.

9. A lubricating grease composition characterized by resistance to deformation and "bleeding," comprising the reaction products of the following ingredients in the indicated proportions:

| | Per cent |
|---|---|
| Fatty material | 8½–48 |
| Alkali | 1½– 7½ |
| Mineral oil | 29½–89½ |
| Water-dispersible polyvinyl alcohol | ½–15 |

10. A lubricating grease composition characterized by resistance to deformation and "bleeding," comprising the reaction products of the following ingredients in the indicated proportions:

| | Per cent |
|---|---|
| Hydrogenated fatty acids | 30.3 |
| Hydrogenated fat | 7.3 |
| Sodium hydroxide | 5.7 |
| Mineral oil | 55.45 |
| Water-dispersible polyvinyl alcohol | 1.25 |

THEODORE G. ROEHNER.
GEORGE W. MURRAY.

REFERENCES CITED

The following references are of record in the file of this patent:

UNITED STATES PATENTS

| Number | Name | Date |
|---|---|---|
| 149,996 | Cook et al. | Apr. 21, 1874 |
| 1,895,014 | Thomsen et al. | Jan. 24, 1933 |
| 2,104,408 | Wiezevich | Jan. 4, 1938 |
| 2,108,644 | Brunstrum | Feb. 15, 1938 |
| 2,303,558 | Kaufman et al. | Dec. 1, 1942 |
| 2,346,124 | Dew | Apr. 4, 1944 |

FOREIGN PATENTS

| Number | Country | Date |
|---|---|---|
| 45,863 | Sweden | Oct. 4, 1919 |